May 21, 1963  R. L. FISCHER  3,090,445
SIMULTANEOUS FEATHER AND PITCH LOCK ACTUATOR
Filed Dec. 19, 1960  3 Sheets-Sheet 1

INVENTOR
RICHARD L. FISCHER
BY Leonard F. Wehrlin
ATTORNEY

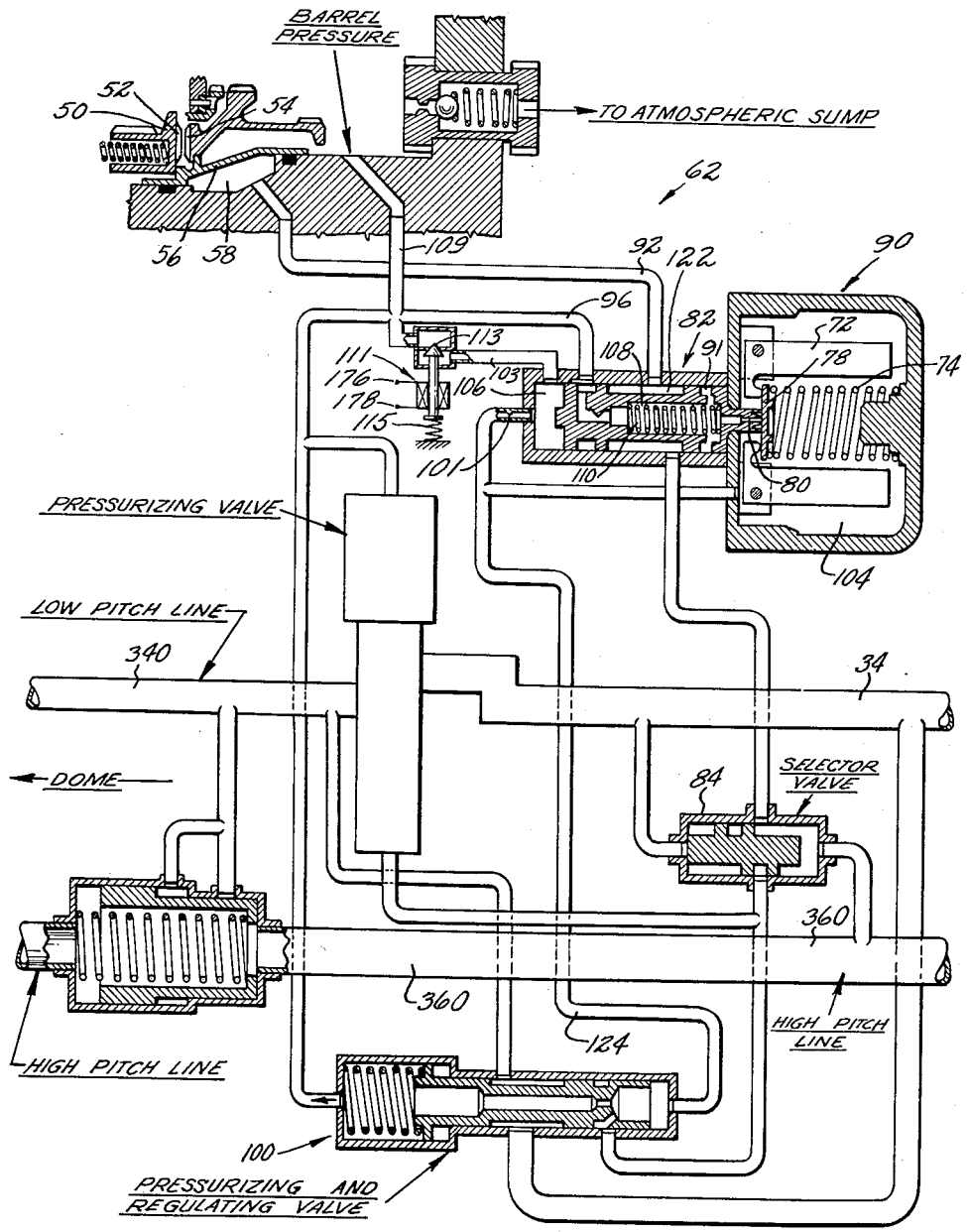

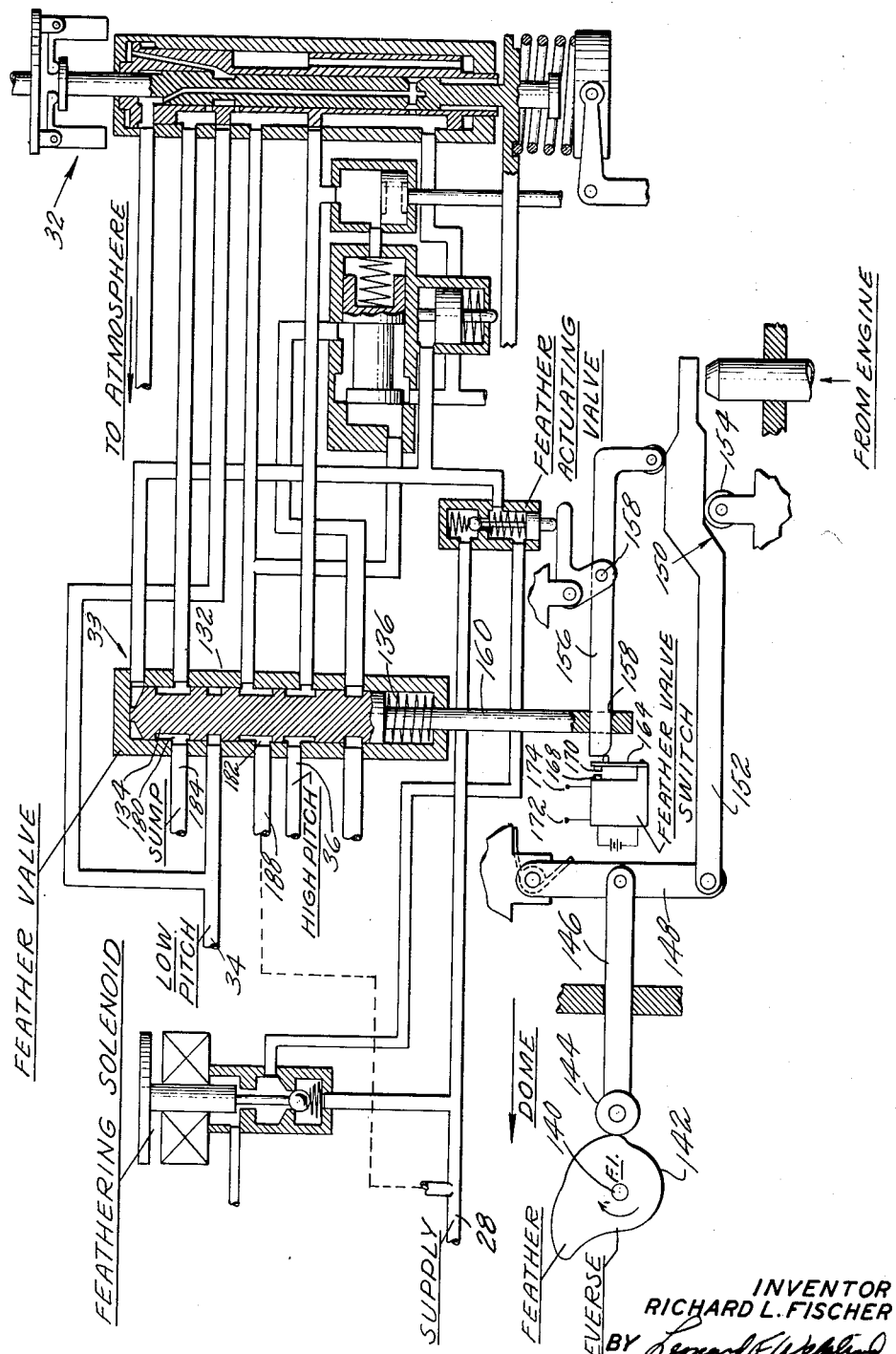

United States Patent Office 3,090,445
Patented May 21, 1963

3,090,445
SIMULTANEOUS FEATHER AND PITCH LOCK ACTUATOR
Richard L. Fischer, Suffield, Conn., assignor to United Aircraft Corporation, East Hartford, Conn., a corporation of Delaware
Filed Dec. 19, 1960, Ser. No. 76,747
5 Claims. (Cl. 170—160.21)

This invention relates to variable pitch propellers and more particularly to pitch lock systems for such propellers and is an improvement on the pitch lock system described and claimed in my application 767,308, filed October 15, 1958, now Patent No. 2,998,849.

It is an object of this invention to provide mechanism for simultaneously actuating pitch lock system upon actuation of the feathering system.

It is a further object to provide a hydroelectric device for providing simplified means for overriding the normal pitch lock control.

A still further object is to provide a pitch lock overriding system which is characterized by being highly reliable, inexpensive, simple in construction, and readily adaptable for hydromechanical pitch lock system.

Other objects and advantages of this invention will be apparent from the following specification and the accompanying drawings.

FIG. 2 is a schematic showing of the control elements and their inner connections for the pitch lock system.

FIG. 3 is a schematic of the control elements in their interconnections for the feathering system.

Figure 1:
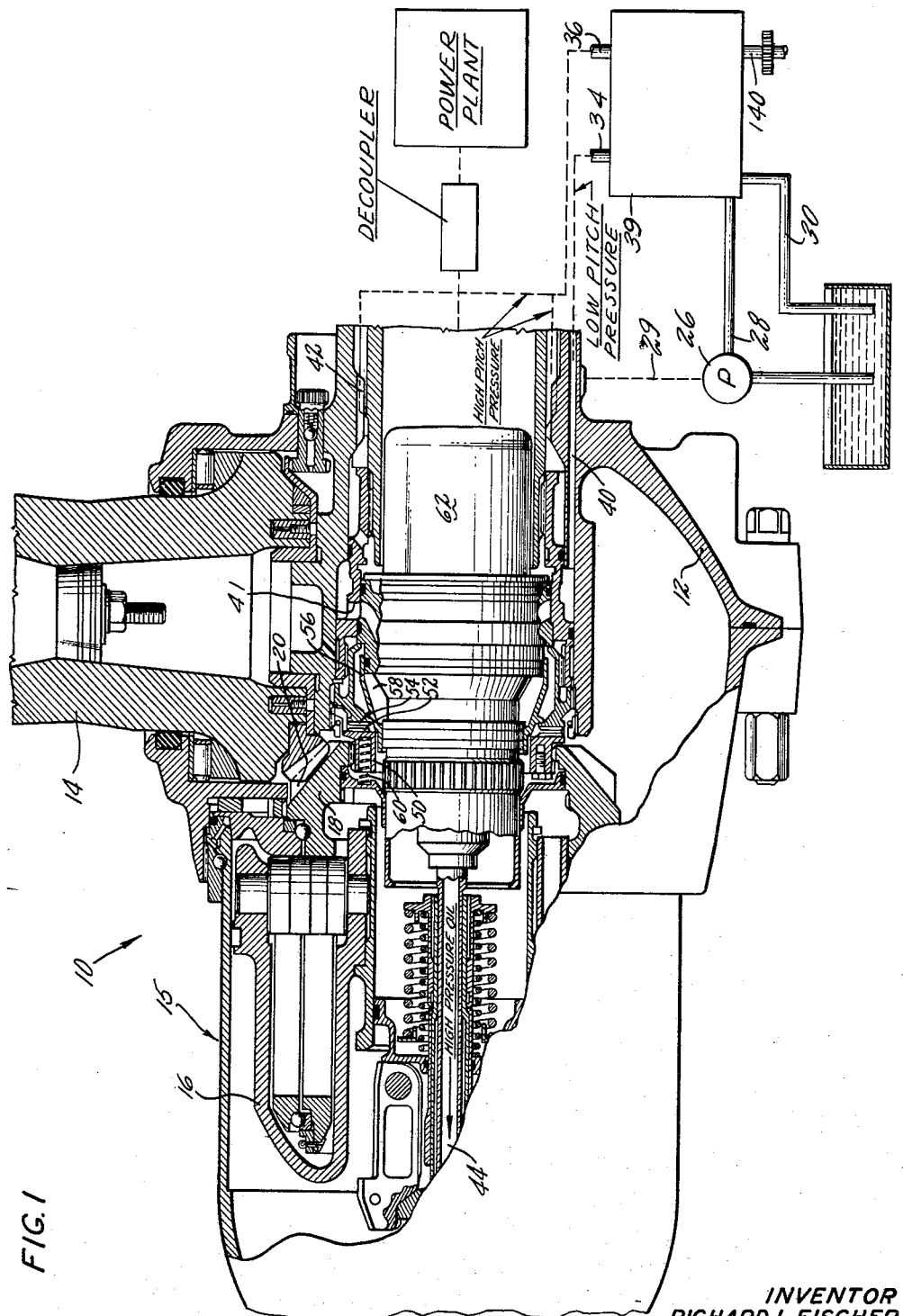
FIG. 1 is a fragmentary view partly in section, partly schematic, and partly in elevation of a controllable pitch propeller incorporating the invention.

In certain aircraft installations having turbine type of power plants the propeller may be directly coupled to the compressor. For safety reasons, these turboprop installations incorporate decoupler mechanism which functions to decouple and disengage the propeller from the engine when the torque being generated by the propeller reaches a certain value. In such installations it has been found that should a malfunction occur in the servo supply fluid, particularly in the location around the sumps and the pumping mechanism, the loss of fluid pressure will cause the pitch of the propeller blades to decrease. The pilot may choose to feather the propellers at this time. Since the system is normally arranged to cut engine power simultaneously with actuating feather, the propellers will no longer be driven by the engine power. If the propeller malfunction is such that feathering cannot be accomplished, the blades may continue changing pitch in the decrease pitch direction. Under this condition the propeller will be delayed from pitch locking because the load of driving the engine will prevent the propeller from overspeeding to the pitch lock setting until a rather low blade angle is achieved. Since for safety reasons, the torque setting of the engine decoupler on such engines closely approximates the torque required from the propeller to drive the engine at the speed setting corresponding to the pitch lock actuator setting, it is possible for the engine to decouple from the propeller before pitch lock occurs. When this occurs, the unloading of the propeller due to decoupling of the engine would normally cause the propeller to evidence a severe overspeed.

As will be more fully appreciated, the present invention overcomes these hazardous conditions and allows the pitch lock to engage when the feathering system is actuated so as to prevent the pitch of the blade from decreasing to a lower blade angle at the instance feathering is initiated and thus the blade angle will be sufficiently high to prevent severe overspeeds when the engine is decoupled.

Referring now more particularly to FIG. 1, a propeller is generally indicated at 10 including a hub 12 which retains a plurality of propeller blades 14 secured thereto for rotation therewith, and a dome section 15 mounted forwardly thereof. The dome contains a hydraulic pitch change motor 16 which moves fore and aft within the dome and through a camming arrangement rotates cam 18 which carries bevel gear 20 whose teeth mate with the teeth of a cooperating bevel gear secured to the root of blade 14. These gears serve to rotate the blade around its longitudinal axis for pitch changing movement in accordance with the position of hydraulic motor 16. Under normal operating conditions, a suitable governor 32 (see FIG. 3) carried in propeller control 39 directs high pressure pump fluid to either side of the pitch change motor for providing its fore and aft movement. Low pitch fluid enters the passage 40 and by suitable connections including passage 41 is directed to the back or hub side of pitch changing motor 16. The high pitch fluid pressure is directed to the line 36 through the splines 42 and the engine drive shaft, and eventually to the central passage 44 to the propeller dome and to the fluid chamber immediately forward of pitch change motor 16. For further reference for similar pitch change mechanism, attention is invited to Patent Nos. 2,635,668 and 2,758,659 for further details. A movable sleeve 50 is splined to the inside diameter of the rotating cam and spring 60 urges the sleeve toward the inboard end of the propeller. This sleeve carries the pitch lock teeth 52 on its inboard side and mates with similar teeth on actuating sleeve which is splined to the barrel. The pitch lock teeth, when engaged, will allow the blades to ratchet toward high pitch, but will prevent movement toward low pitch. As is more clearly shown in FIG. 2, the hydraulic piston 56 which forms one end of a chamber 58 presses against movable sleeve 50 which holds the teeth out of engagement. As will be more fully explained hereinafter, chamber 58 is supplied with high pressure for keeping the teeth out of engagement and upon a loss of pressure in chamber 58 the force generated by spring 60 will cause the teeth to engage and thus prevent the propeller blades from moving toward low pitch. Due to the shape of the teeth, the blade can be advanced to a higher pitch angle even though the teeth are held in engagement. For further reference to this pitch lock mechanism, attention is invited to the above-referred-to Fischer et al. application, 767,308 filed October 15, 1958.

Still referring to FIG. 1, the overspeed control which regulates the position of the pitch lock is shown in full in 62. Servo pressure is supplied by a suitable pump 26 which is directed to the propeller control via line 28. The pump may be driven by the rotating hub as schematically shown by dash line 29. A suitable drain line 30 is also provided. The independent feathering system generally indicated by numeral 33 (FIG. 3) and carried in propeller control 39 is disposed between the governor and the pitch change motor and functions to bypass the governor for placing the pitch of the blades in its highest or feather angle by directing pump pressurized fluid directly to the high pitch side of the hydraulic pitch changing motor 16 and simultaneously connecting the low pitch side to drain. For a more detailed description of the feathering system, reference is hereby made to application 684,314, entitled "Independent Feathering System," dated September 16, 1957, and assigned to the same assignee, now issued as Patent No. 3,004,608. It should be realized that feathering can be actuated in a number of well-known ways.

Now referring to FIG. 2, low pitch line 340 and high pitch line 360 are shown connected in parallel relation and receive hydraulic fluid either through the governor or the feathering system as was described hereinabove and directs the fluid to the chambers fore and aft of the pitch changing system 16. Selector valve 84 serves to direct high pressure fluid to chamber 58 by way of pitch lock valve 82 by feeding fluid from either line 340 or 360 depending which is at the higher pressure value. Pressurizing and regulating valve 100 provides pressurized fluid to the pitch lock valve 82 through line 124 and also pressurizes chamber 104 which is formed within housing 90. Housing 90 contains the pitch lock speed responsive device which includes a pair of flyweights 72 which are coupled in any suitable manner to the rotating propeller. The height of spring 74 determines the force exerted by the spring which counteracts the centrifugal force created by the rotating flyweights. The spring at its left end engages flapper 78 which can control the amount of flow through variable orifice 80. It will be noted that the flyweights 72 are set higher than and are independent of the normal propeller governor so that the pitch lock will not actuate while the normal governing is controlling. Thus in the event of an overspeed, the flyweights will generate sufficient force so as to cause flapper 78 to lift off of the orifice 80, admitting fluid into chamber 91 equalizing the force across spool 108 so that the spring 110 causes the spool 108 to shift to the left and thus connecting chamber 58 to drain or barrel pressure. For a more detailed description of the normal pitch lock operation, reference should be made to the Fischer et al. application 767,308 supra. In accordance with this invention, restrictor 101 is disposed in line 124 just upstream of valve 82. A conduit 103 connects chamber 106 of valve 82 with drain or barrel pressure through line 109. Solenoid 111 is disposed in line 103 and contains movable valve member 113 which is urged in its closed position by return spring 115. The solenoid valve may be electrically actuated in a manner to be described hereinafter. From the foregoing, it will be apparent that upon actuation of solenoid 111, valve element 113 will become unseated, communicating chamber 106 directly with drain or barrel pressure via line 109. By unseating valve element 113 a pressure drop across restrictor 101 will be evidenced which in turn reduces the pressure in chamber 106 and by action of spring 110, valve spool 108 will shift to the left connecting chamber 58 to drain via passage 92, annular chamber 122, and passages 96 and 109. This permits the spring in the pitch lock mechanism as described above to put mating teeth 52 and 54 into engagement and thus prevent the pitch of the blades from decreasing. It will be appreciated from the foregoing that upon actuation of the pitch lock solenoid, the system just described will override the normal pitch lock system, thus actuating pitch lock regardless of the speed of the propeller. Obviously under certain pressure failures the fluid pressure in chamber 58 of the pitch lock mechanism would decrease allowing the pitch lock to engage regardless of the signals generated by the pitch lock speed sensing device. However, in certain malfunctions, particularly malfunctions occurring in the pumping mechanism or fluid sumps, the normal pitch lock actuating mechanism would be insensitive to these types of failures. This is primarily due to the fact that the fluid in the pitch lock mechanism is continually being pressurized by the force created by the twisting moment generated by the rotating propeller and blades.

Normally, when such a failure occurs, the pilot is made aware of a malfunction and would be prone to actuate the feathering control to initiate feathering. In accordance with this invention the pitch lock will simultaneously be energized when the feathering mechanism is actuated. It should be realized that the novel concept embodies the situation of initiating pitch lock simultaneously with feather regardless of what means are utilized for initiating feather as will be more apparent from the description immediately to follow.

Referring now particularly to FIG. 3, numeral 33 generally refers to the feathering valve which comprises housing 132 and valve spool 134. Under normal propeller operating conditions, the valve spool is held in its uppermost position by spring 136 such that the annular chambers are in alignment with their cooperating ports for uninterrupted communication with the fluid regulated by the governor valving system which is generally indicated by numeral 32. Since the governor does not form part of this invention, for convenience, a detailed description thereof is completely omitted. For further information to a similar governing system, reference is hereby made to the Pond application now issued as Patent No. 3,004,608 supra. The feathering of the propeller blades may be initiated in several different ways and again for convenience only one of these ways will be discussed in this specification. Should the pilot desire to initiate feathering, the control lever would be rotated which in turn rotates shaft 140 which carries cam 142. Upon rotation of the cam, the feathering surface will engage the follower 144 which is rotatably secured to the horizontal link 146. This horizontal link carries at its right end a pivot connection which is secured to the lever 148 intermediate the ends thereof. It will be noted that upon initiating feathering, the above described linkages will be moved toward the right so that the cam surface 150 on the cam 152 engages roller 154 which causes the cam 152 to lift in an upward direction. This causes the L shaped arm 156 to pivot about pivot point 158 in a counterclockwise direction. The bottom left hand surface of 156 engages shoulder 158 which projects from the spool arm 160. The left edge 162 of arm 156 presses against the feathering valve switch 164 for placing the contact points 168 and 170 in contact. The leads 172 and 174 of the feathering valve switch are connected by any suitable conducting material to leads 176 and 178 of the solenoid.

From the foregoing, it will be apparent that upon actuation of the switch, the pitch lock solenoid will simultaneously be actuated. Thus, it will be realized that whenever the spool valve 134 of the feathering valve is urged downwardly against return spring 136, the switch will be actuated so that when ever feathering is initiated regardless of how the feathering actuation has been initiated, the pitch lock will also be actuated. Valve 33 serves to bypass the governor system 32 by conducting pump high pressure fluid to the high pitch side of the pitch change piston and conducting the low pitch pressure from the low pitch side of the pitch change piston to the sump. Thus as the spool moved downwardly, the annular chamber 180 lines up with lines 184, and 34 and annular chamber 181 lines up with lines 188, and 36, respectively.

In summary then, upon actuating the feathering valve switch an electric current will be conducted to the solenoid of the pitch lock which causes the pitch lock valve element 113 to unseat and place chamber 106 of the pitch lock control valve directly in communication with barrel pressure via lines 103 and 109. The valve spool 108 will shift to the left so as to drain the pressurized fluid from chamber 58 via passage 92, annular chamber 122 and passages 96 and 109 and hence allow pitch lock mechanism to engage. Thus in the event that the propeller becomes decoupled from the engine, the feathering mechanism which is unable to supply pitch changing fluid due to a malfunction as previously described causes the pitch lock to engage for preventing the pitch of the propeller to go toward the flat pitch. In this situation, severe overspeed is avoided as would be expected without such provisions as described above.

What has been described is a novel and simplified means for adapting a pitch lock device to be actuated upon the simultaneous actuation of the feathering system.

It is to be understood that the invention is not limited to the specific embodiment herein illustrated and de-

I claim:

1. In an engine driven propeller having a decoupler device interposed between the engine and propeller the combination comprising variable pitch propeller blades, a pitch lock device including independent coordinating means, a feathering mechanism including independent coordinating means, overriding means for actuating the pitch lock device and operable independently of said pitch lock coordinating means, said independent feather coordinating means including a control valve for advancing the pitch to a higher blade angle, said control valve producing a signal, means responsive to said signal for controlling said overriding means, when the control valve fails to advance the pitch to a higher blade angle.

2. A combination as claimed in claim 1 in which said pitch lock coordinating means includes a casing defining a fluid chamber, a piston disposed in said chamber, sources of high and low pressure fluids, fluid connecting means for conducting high pressure fluid to said pitch lock device, said piston cooperating with said connecting means for normally directing high pressure fluid to said pitch lock device, a speed responsive device cooperating with said chamber for normally controlling the position of said piston, said overriding means comprising normally closed valve means and fluid passage means connecting said chamber to said low pressure source, said signal causing the last mentioned valve means to open so as to drain the fluid chamber to allow the piston to move in a direction for cutting off the supply of fluid to the pitch lock device and simultaneously communicating the pitch lock device to said low pressure source.

3. A combination as claimed in claim 2 including a passage for admitting high pressure fluid in said chamber, a fluid restrictor disposed in said passage.

4. For a turbine type power plant driven propeller having a decoupler device coupling the power plant to the propeller, variable pitch propeller blades, the combination comprising a pitch lock device having coordinating control means, a feathering device having coordinating control means, said pitch lock coordinating means comprising a casing defining a fluid chamber and including fluid connecting means for communicating fluid to said pitch lock device, a movable member disposed in said chamber and normally directing fluid to said pitch lock device, a spring acting on one end of said member urging the member to a pitch lock closing position, fluid connecting means including a passage for admitting high pressure fluid into said chamber urging said movable member in an opposing pitch lock opening direction, a drain means, a normally closed valve connecting said chamber to said drain means, means responsive to the feathering device for opening said valve for conducting fluid from said chamber to said drain means for effectuating movement of said member in a pitch lock closing position.

5. A combination as claimed in claim 4 including a source of electrical energy, switch means cooperating with said feathering coordinating means, a solenoid operatively connected to said normally closed valve, said switch means connecting said solenoid to said energy for causing said valve to open.

References Cited in the file of this patent

UNITED STATES PATENTS

| | | |
|---|---|---|
| 2,571,848 | Ehlers | Oct. 16, 1951 |
| 2,703,148 | Pearl | Mar. 1, 1955 |
| 2,985,244 | Fischer et al. | May 23, 1961 |